(12) United States Patent
Cipollone et al.

(10) Patent No.: US 8,499,071 B2
(45) Date of Patent: Jul. 30, 2013

(54) APPLICATION MONITORING (75) Inventors: Stefano Cipollone, Milan (IT); Vittorio Roberto De Finis, Milan (IT)

(73) Assignee: NCR Corporation, Duluth, GA (US)

( * ) Notice: Subject to any disclaimer, the term of this patent is extended or adjusted under 35 U.S.C. 154(b) by 390 days.

(21) Appl. No.: 12/433,959

(22) Filed: May 1, 2009

(65) Prior Publication Data
US 2010/0281155 A1 Nov. 4, 2010

(51) Int. Cl.
*G06F 15/173* (2006.01)

(52) U.S. Cl.
USPC .......................................................... 709/224

(58) Field of Classification Search
USPC .................................. 709/223–225
See application file for complete search history.

(56) References Cited

U.S. PATENT DOCUMENTS

| | | | | |
|---|---|---|---|---|
| 7,051,096 B1 * | 5/2006 | Krawiec et al. | ............... | 709/223 |
| 7,100,818 B2 * | 9/2006 | Swaine | .......................... | 235/379 |
| 7,222,151 B1 * | 5/2007 | Schaeck | ......................... | 709/202 |
| 7,225,973 B2 * | 6/2007 | McInally et al. | ............... | 235/379 |
| 7,677,447 B2 * | 3/2010 | MacPhail et al. | ............. | 235/380 |
| 7,693,976 B2 * | 4/2010 | Perry et al. | ...................... | 709/223 |
| 7,752,306 B2 * | 7/2010 | Komlenic et al. | ............. | 709/224 |
| 7,761,550 B2 * | 7/2010 | Komlenic et al. | ............. | 709/223 |
| 7,814,191 B2 * | 10/2010 | Komlenic et al. | ............. | 709/223 |
| RE43,046 E * | 12/2011 | Bourgart | ..................... | 455/67.11 |
| 8,185,620 B1 * | 5/2012 | Boone et al. | ................... | 709/224 |
| 2003/0140133 A1 * | 7/2003 | Huntley et al. | ................ | 709/223 |
| 2005/0006459 A1 * | 1/2005 | McInally et al. | ............... | 235/379 |
| 2006/0242284 A1 * | 10/2006 | Savage | ........................... | 709/223 |
| 2007/0150364 A1 * | 6/2007 | Monaghan et al. | ............. | 705/26 |
| 2009/0138393 A1 * | 5/2009 | Lemons et al. | .................. | 705/35 |

\* cited by examiner

*Primary Examiner* — Alicia Baturay
(74) *Attorney, Agent, or Firm* — Paul W. Martin; Joseph P. Merhle (57) ABSTRACT

A method and apparatus for monitoring an application executing on a self-service terminal. The method comprises: registering with a services manager (such as an XFS or J/XFS manager) to receive event reports indicative of a change of state being sent to the application; accessing an operating system function to deduce a current status of the application; and communicating a status of the application to the remote management system, without communicating with the application, to enable the remote management system to manage the self-service terminal more effectively.

13 Claims, 6 Drawing Sheets

APPLICATION MONITORING

FIELD OF INVENTION

The present invention relates to a method and apparatus for application monitoring. In particular, but not exclusively, the invention may be implemented in a self-service terminal (SST).

BACKGROUND OF INVENTION

A self-service terminal is generally defined as a device that is suitable for allowing a customer to conduct a transaction or to access information in an unassisted manner (that is, without requiring help from a human) and/or in an unattended environment (that is, an area that is not constantly supervised by someone physically present to ensure that the SSTs are not being misused). An SST deployer may decide to provide human assistance and/or supervision for customers of the SST (such as in a retail, airport, or hotel location); however, SSTs are typically designed so that such assistance and/or supervision is not essential. A common type of SST is an automated teller machine (ATM).

To ensure that an ATM remains operational, it typically includes management software for collating information from modules within the ATM, and status information about applications executing on the ATM. The management software typically notifies a remote management system of any errors or malfunctions that are detected in the ATM together with status information.

It is now common for an ATM owner to use an ATM control application provided by a first vendor on an ATM provided by a second vendor (different from the first vendor). An ATM control application provides transaction processing functions for customers, and module management functions for service personnel (such as engineers).

Transaction processing functions include a sequence of screens displayed to the customer, and associated commands for controlling the modules in response to customer inputs. Module management functions include state of health information and module test routines.

If the second vendor is responsible for servicing and maintaining the ATM, then the second vendor may not have access to information from the control application because this is provided by a different vendor and may not report status information to any entity outside itself (that is, outside of the control application). This makes it very difficult for the second vendor to manage the ATM efficiently.

It is among the objects of an embodiment of the present invention to obviate or mitigate the above problem, or other problems associated with prior art SSTs and/or the management thereof.

SUMMARY OF INVENTION

Accordingly, the invention generally provides methods, systems, apparatus, and software for application monitoring.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of monitoring an application executing on a self-service terminal, the method comprising:

registering with a services manager to receive event reports indicative of a change of state relating to the application;

accessing an operating system function to deduce a current status of the application; and communicating a status of the application to the remote management system, without communicating with the application, to enable the remote management system to manage the self-service terminal more effectively.

The services manager may be an XFS (extensions for Financial Services) manager, a J/XFS manager, or any other convenient software manager.

By virtue of this aspect of the invention, software can be provided that deduces the state of an SST application without requiring an interface to that application, or any communication (direct or indirect) between that application and the software. This enables the status of a third party application to be conveyed to a remote management system.

The event reports indicative of a change of state relating to the application may comprise event reports relating to a change in state of a physical switch used to change the application from transaction mode to supervisor mode (for example, a supervisor switch on a operator personnel panel).

The physical switch may be depressed by a service engineer. Alternatively, the physical switch may be triggered by opening a door.

The event reports indicative of a change of state relating to the application may comprise event reports relating to a change in state of an open/closed indicator for indicating to a customer that the self-service terminal is either in-service or out-of-service.

The event reports indicative of a change of state relating to the application may comprise event reports relating to a notification of entry into vendor dependent mode (VDM).

Accessing an operating system function to deduce a current status of the application may comprise ascertaining if the application is listed on an operating system active process list.

Accessing an operating system function to deduce a current status of the application may comprise ascertaining if the application is listed as being in an executing state.

Accessing an operating system function to deduce a current status of the application may comprise ascertaining if a central processing unit on which the application is intended to execute has a current utilization for that application that is non-zero or variable. A zero percent utilization may indicate that the application has 'crashed' or 'hung'.

The method may further comprise testing a communications connection to a remote authorization host to deduce the communication status of the application.

Testing a communications connection may be implemented by executing a 'ping' on the internet protocol (IP) address of the remote authorization host. Alternatively or additionally, testing a communications connection may be implemented by monitoring communication packet traffic. Alternatively or additionally, testing a communications connection may be implemented by direct messaging to the monitored application.

According to a second aspect there is provided a monitoring component for monitoring an application executing on a self-service terminal, the monitoring component comprising:

a defined software interface for receiving event reports indicative of a change of state relating to the application;

an operating system interface for accessing an operating system function to deduce a current status of the application; and a communications interface for communicating a status of the application to the remote management system based on information received from at least one of the defined software interface and the operating system interface, to enable the remote management system to manage the self-service terminal more effectively.

The defined software interface may be an XFS interface, a J/XFS interface, or the like.

According to a third aspect there is provided a self-service terminal including the monitoring component of the second aspect.

The self-service terminal may be an automated teller machine (ATM), an information kiosk, a financial services center, a bill payment kiosk, a lottery kiosk, a postal services machine, a check-in and/or check-out terminal such as those used in the retail, hotel, car rental, gaming, healthcare, and airline industries, or the like.

According to a fourth aspect there is provided a computer program comprising program instructions for implementing the steps of the method according to the first aspect.

The computer program may be embodied on a medium (such as an optical disc, a magnetic disc, a solid-state memory, or the like), conveyed on an electrical carrier signal, or the like.

According to a fifth aspect there is provided a method of monitoring an application executing on a self-service terminal, the method comprising:

registering with a management component in the self-service terminal to indicate types of event reports to be received;

receiving event reports indicative of a change of state relating to the application;

periodically polling an operating system function to deduce a current status of the application; and communicating a status of the application to the remote management system, without communicating with the application, to enable the remote management system to manage the self-service terminal more effectively.

The change of state events may be generated by a service provider associated with a module within the self-service terminal.

According to a sixth aspect there is provided a method of monitoring an application executing on a self-service terminal, the method comprising:

registering with a services manager executing on the self-service terminal to receive event reports indicative of a change of state of the self-service terminal; and communicating a status of the application to a remote management system in the event of either (i) receiving an event report indicative of a change of state from vendor independent mode to vendor dependent mode, or (ii) receiving an event report indicative of a change of state of the application from in-service mode to out-of-service mode.

This aspect also has the advantage that a monitoring application can be used to convey updated status information about a control application to a remote management system without needing to communicate with the control application or to use the control application to effect the communication to the remote management system.

These and other aspects will be apparent from the following specific description, given by way of example, with reference to the accompanying drawings.

DETAILED DESCRIPTION

Figure 1:
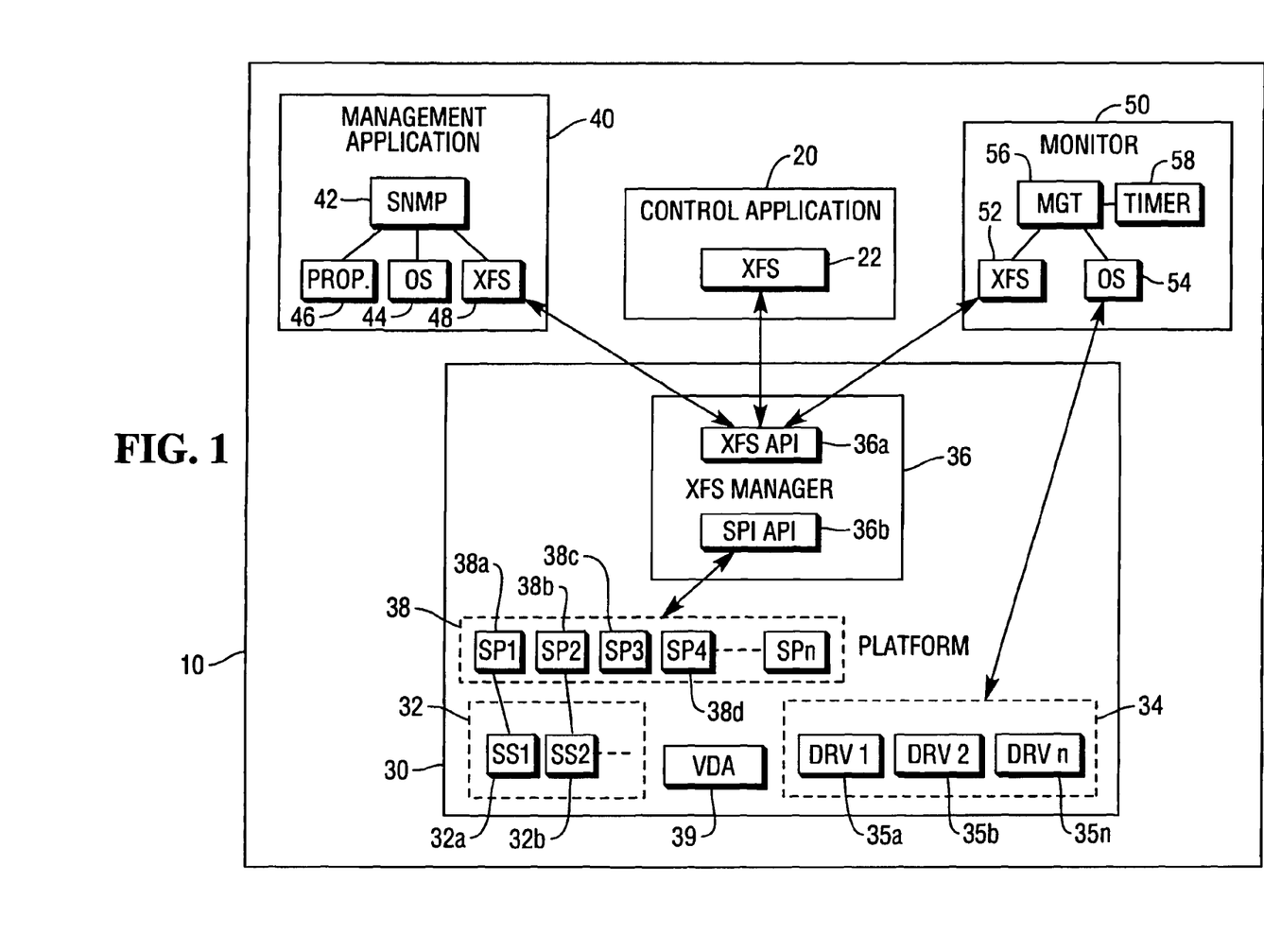
FIG. 1 is a schematic diagram of an SST memory executing software components according to an embodiment of the present invention.

Reference will now be made to FIG. 1, which is a schematic diagram showing an SST memory 10 executing software components. In this embodiment the SST is an ATM. The software components comprise: a control application 20, a runtime platform 30, a management application 40, and a monitor application 50.

The Control Application 20

As is known in the art, the control application 20 presents a sequence of screens on an ATM display to a customer at the ATM, collates information from the customer (for example, customer account information from a customer's ATM card, transaction request, and the like), obtains authorization for a transaction request from a remote authorization host (not shown in FIG. 1), and instructs modules within the ATM, as needed, to fulfill an authorized transaction.

As is also known in the art, the control application 20 also comprises a conventional CEN XFS interface 22 for communicating with a services manager in the form of an XFS manager (described as box 36 below) in the runtime platform 30. In other words, the control application 20 is a conventional ATM control application having a conventional CEN XFS interface. CEN is the European Committee for Standardization, and XFS is the extensions for Financial Services standard. The current version of this CEN XFS standard is v.3.10.

The Runtime Platform 30

The runtime platform 30 comprises proprietary run-time components (illustrated by the broken line box 32), an operating system kernel (illustrated by the broken line box 34), an XFS manager 36, service providers 38, and a Vendor Dependent Application (VDA) 39 for providing diagnostic and maintenance functions.

In this embodiment, the operating system is a Windows XP (trade mark) operating system, available from Microsoft Corporation (trade mark). The operating system includes a plurality of device drivers 35a,b, . . . for interfacing with standard home computing devices such as a magnetic disk drive, a display, a serial port, a parallel port, and such like. As is well known in the art, the operating system kernel 34 is responsible for memory, process, task, and disk management, and includes routines for implementing these functions.

The proprietary run-time components 32 are a set of APTRA (trade mark) XFS components, available from NCR Corporation, 1700 S. Patterson Blvd., Dayton, Ohio 45479, U.S.A. The run-time components 32 provide a range of programming facilities specific to self-service terminal devices and services.

One function of the run-time components 32 is to enhance the operating system 34 so that the operating system 34 and run-time components 32 together provide high level access to all of the devices and modules, including both standard home computing devices (via the operating system 34), and XFS computing devices (via the run-time components 32). Thus, the combination of the run-time components 32 and the operating system 34 can be viewed as providing a complete ATM operating system.

The run-time components 32 comprise a plurality of self-service device drivers 32a,b, . . . that interface with self-service specific devices, together with support files (not shown), to allow each device or module to be operated, tested, maintained, and configured. Although only a few device drivers 32 are shown, there are many device drivers in the run-time components 32, one for each self-service specific module, such as a card reader (not shown), a receipt printer (not shown), an encrypting keypad (not shown) and FDKs (not shown), and a cash dispenser (not shown). Furthermore, there are many more devices and modules in an ATM than those described herein, for example there are more standard computing devices such as serial ports (for example, a USB port) and a parallel port, there may also be more self-service devices and modules, such as a statement printer, a cash accept module, and the like. These devices and modules are not discussed herein because they are not essential to an understanding of the invention.

The XFS manager 36 includes an XFS application programming interface (API) 36a and a service provider interface 36b.

The service providers 38 communicate with the XFS manager 36 and also with the device drivers 35 associated with the modules. Suitable service providers are available from NCR Corporation, 1700 S. Patterson Blvd. Dayton, Ohio 45479, U.S.A.

The service providers 38 provide a high level of abstraction to allow the control application 20 to issue standard XFS commands to request functions and services. The service providers 38 translate these XFS commands for the particular device drivers 32,35 used in the runtime platform 30. Each service provider 38 is typically associated with one module (such as a cash dispenser module); however, one of the service providers 38c is associated with vendor dependent mode (which is a logical device). A service provider (the Sensors and Indicators Units (SIU) service provider) 38d is associated with switches, microswitches, sensors, and LEDs that are distributed across the ATM.

The Vendor Dependent Application (VDA) 39 is accessed via the control application 20 (typically by a service person selecting supervisor mode on the ATM and then selecting a maintenance/diagnostics mode. When this occurs the control application 20 goes offline (after concluding any transaction currently in progress) and passes control of the modules to VDA 39. Control is passed to VDA 39 once the modules have all entered vendor dependent mode (VDM). This will be described in more detail below.

The Management Application 40

The management application 40 is used for collating management information from the modules within the ATM, and for sending and receiving management messages.

The management application 40 comprises an SNMP (simple network management protocol) portion 42 that handles communications, creates traps, sends these traps to a remote management system, and the like. The SNMP portion 42 also includes one or more non-proprietary objects 44, one or more proprietary objects 46, and a CEN object 48.

The non-proprietary objects 44 are typically in the form of DLLs and are used for communicating with industry-standard devices and modules within the ATM, such as USB ports, magnetic disk drives, and the like. The proprietary object 46 is typically also in the form of a DLL and is customized for proprietary modules in the ATM (or modules with proprietary features), such as the card reader, the encrypting keypad, the cash dispenser, and the like. The CEN object 48 communicates with the XFS manager 36 (specifically, the XFS API 36a). The management application 40 includes conventional components for managing state of health information relating to the modules in the ATM.

The control application 20, platform 30, and management application 40 are conventional and available from ATM vendors, such as NCR Corporation or its competitors. These components can be used in embodiments of the present invention without any modification. The new application provided herein is the monitor application 50.

The Monitor Application 50

The monitor application 50 is used for deducing the state of the control application 20 without having any interface to the control application 20.

The monitor application 50 comprises: an XFS application programming interface (API) 52, an operating system interface 54, a remote management system interface 56, and a timer 58.

The monitor XFS API 52 is used to communicate with the XFS manager 36 (specifically, the XFS API 36a). This enables the monitor application 50 to receive messages from the service providers, such as the VDM service provider 38c and the SIU (the Sensors and Indicators Units) service provider 38d. This is described in more detail below.

The operating system interface 54 is a conventional interface that allows the monitor application 50 to query operating system components to ascertain information such as the current active processes executing on the central processing unit (CPU) with which the memory 10 is associated, the CPU utilization percentage for a particular process, and the like.

The remote management system interface 56 receives status messages through the monitor XFS API 52 and the operating system interface 54, and communicates these to a remote management system (not shown in FIG. 1).

Figure 2:
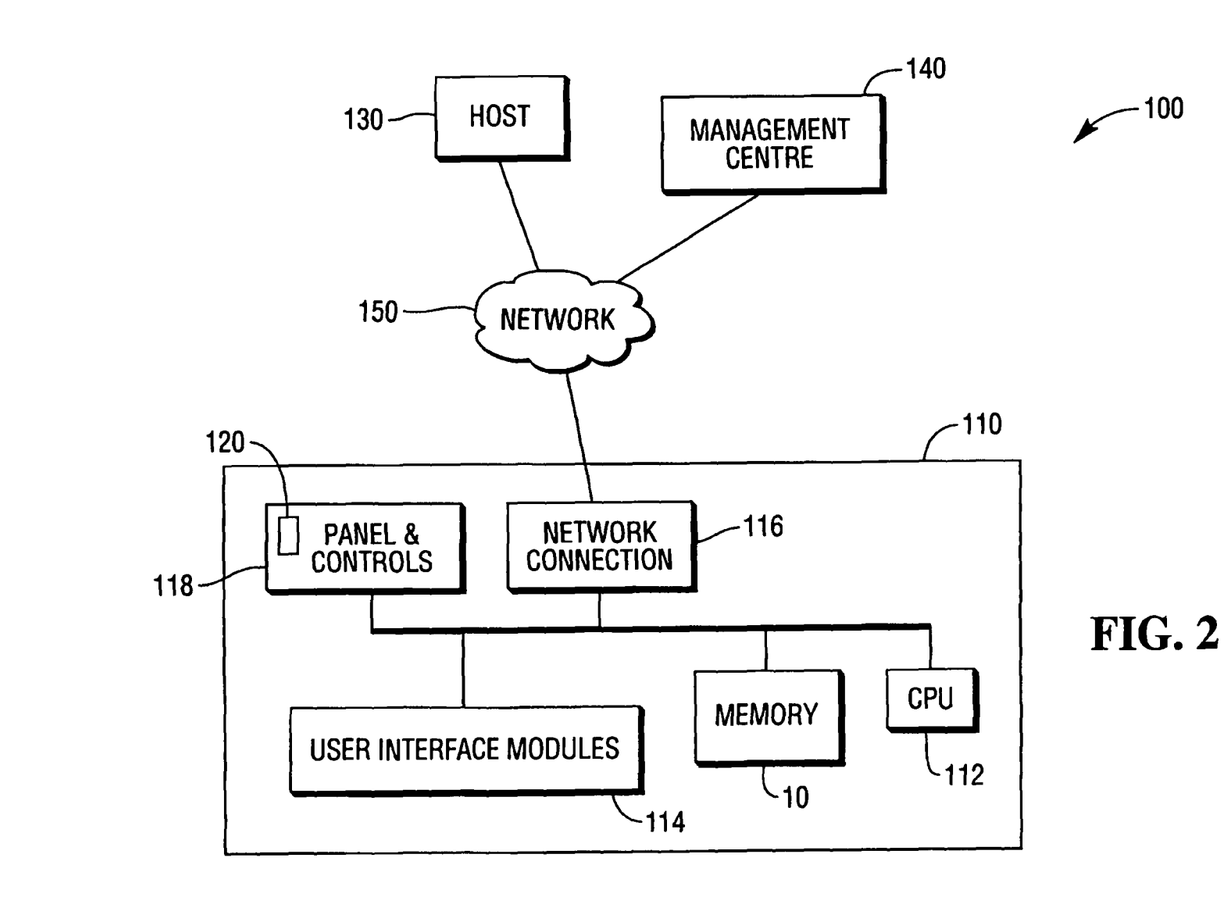
FIG. 2 is a simplified schematic diagram of an SST network including an SST having an SST memory executing the software components of FIG. 1.

Reference will now be made to FIG. 2, which is a simplified schematic diagram of an ATM network 100 including an ATM 110 incorporating the ATM memory 10 executing the software components described with reference to FIG. 1.

The ATM 110 comprises a central processing unit (CPU) 112 coupled to the memory 10, a plurality of user interface modules 114 (not shown in detail, but including a cash dispenser, a card reader, a display, a receipt printer, an encrypting keypad, and the like), a network connection module 116, and a service operator panel 118.

The service operator panel 118 enables diagnostic tests to be performed on, and information to be retrieved from, the modules 114,116 within the ATM 110.

The service panel 118 includes a physical mode switch 120 for switching the ATM 110 between transaction mode and supervisor mode. In supervisor mode, a service engineer can execute the VDA 39 to enter vendor dependent mode (VDM) and execute replenishment, maintenance, or diagnostic tasks. When the engineer has completed this, then he/she can exit the VDA component 39 and press the mode switch 120 to return control of the modules 114,116 to the control application 20. This is referred to as returning to transaction mode.

The network connection module 116 enables the ATM 110 to communicate with a remote authorization host 130 for authorizing transactions requested by an ATM customer, and also enables the ATM 110 to communicate with a remote management system 140 to send status information as requested by the remote management system 140, and also to send fault signals in response to a fault condition being detected, as will be described in more detail below.

Communication between the ATM 110, the authorization host 130, and the remote management system 140 is achieved using a network 150.

Deducing Current State of the Control Application

Reference will now be made to FIG. 3, which is a flowchart illustrating steps involved when the monitor application 50 deduces a current state of the control application 20. For clarity, FIG. 3 has been split into four flowcharts (FIGS. 3A to 3D).

Figure 3A:
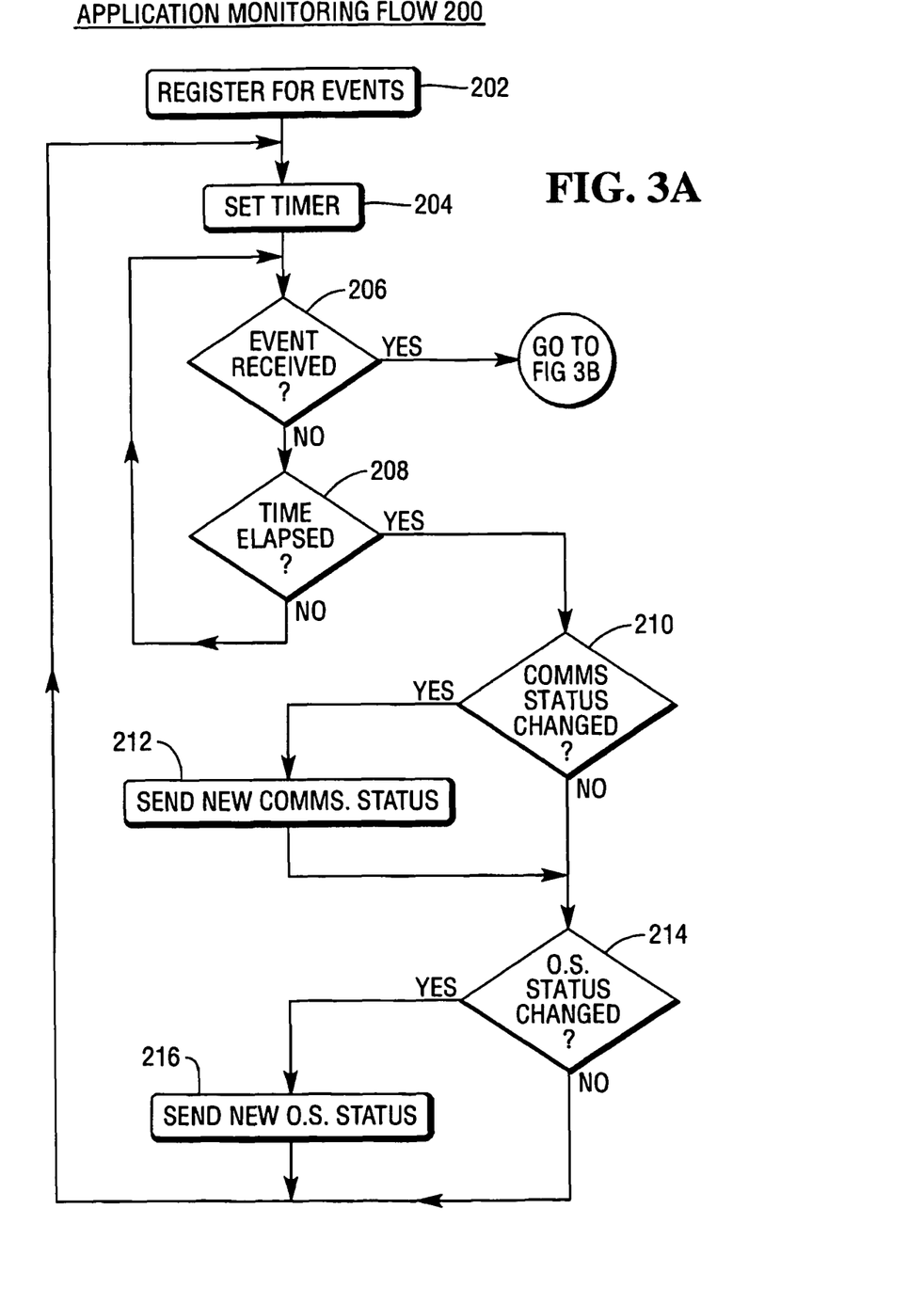
FIG. 3 is a flowchart illustrating steps involved when one of the software components of FIG. 1 (the monitor application) deduces a current state of another of the software components of FIG. 1 (the control application).

Initially, the monitor application 50 registers with the appropriate service providers 38 via the XFS manager 36 (step 202). In this embodiment, the monitor application 50 registers with the VDM service provider 38c and the SIU servicer provider 38d. This enables the monitor application 50 to receive notifications from the VDM service provider 38c that the ATM 110 is entering or exiting vendor dependent mode (VDM). This also enables the monitor application 50 to receive notifications of status changes of indicators and switches from the SIU service provider 38d, as will be explained in more detail below.

The next step is for the monitor application 50 to set the internal timer 58 to a preset value (step 204). The purpose of the timer 58 is to recreate the effect of a heartbeat for the control application 20. When the timer 58 has decremented to zero, then the monitor application 50 interrogates the operating system 34 (via the operating system interface 54) to obtain evidence that the control application 20 is still executing.

The initial value to which the timer 58 is set is not critical. A low initial value (for example, ten seconds) will result in frequent calls to the operating system 34, which is inefficient. A very high initial value (for example, ten hours) will result in very infrequent calls to the operating system 34, so the control application may have hung for hours before it is detected by the monitor application 50. In this embodiment, an initial value of ten minutes is selected for convenience.

The next step is for the monitor application 50 to detect if an event has been received (step 206) from one of the service providers 38c,d that the monitor application 50 has registered with. The monitor application 50 is registered to receive events from the VDM service provider 38c and the SIU service provider 38d.

Figure 3B:
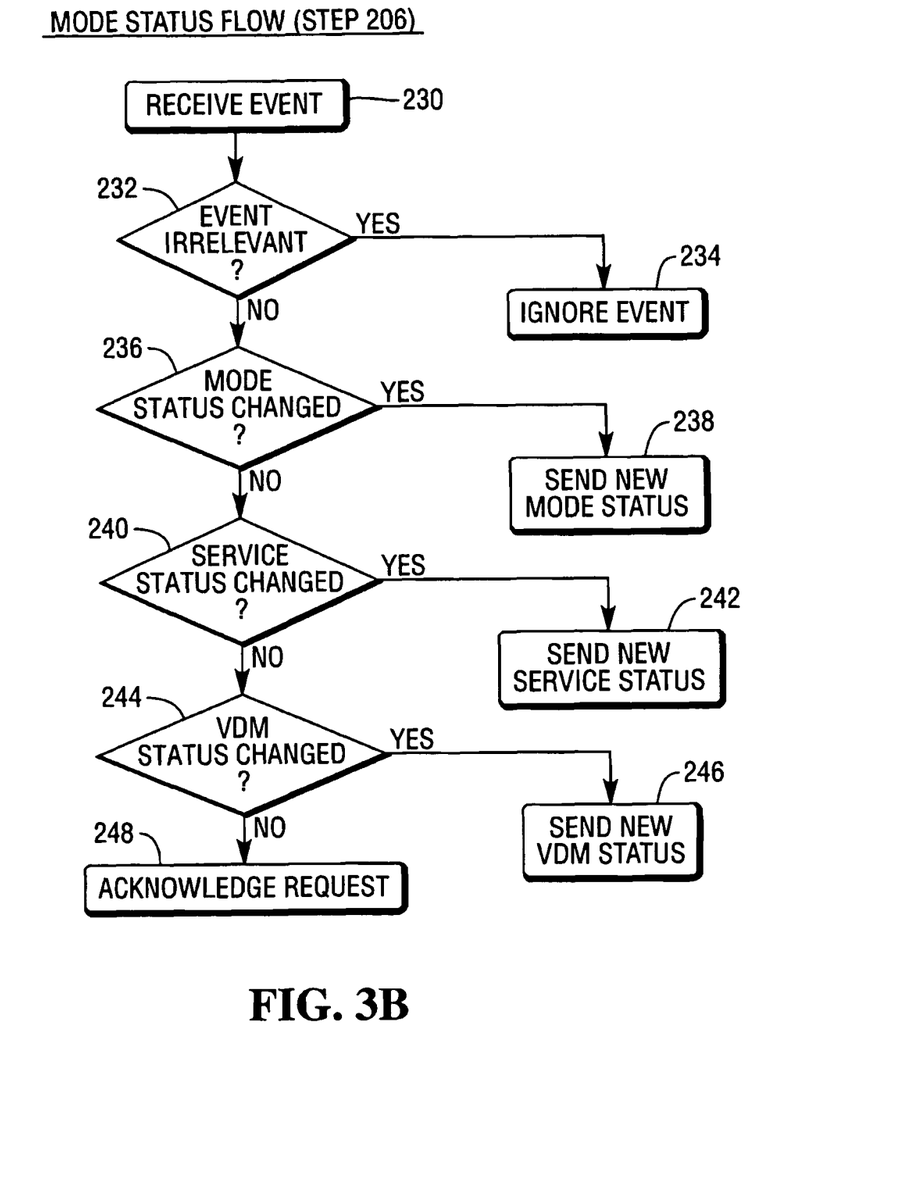

If an event is received (step 206) then the event is processed as described in detail below with reference to FIG. 3B.

If an event is not received, then the next step is for the monitor application 50 to detect if the value of the timer 58 has decremented to zero (step 208).

If the value of the timer 58 has not decremented to zero then the monitor application returns to step 206.

Figure 3C:
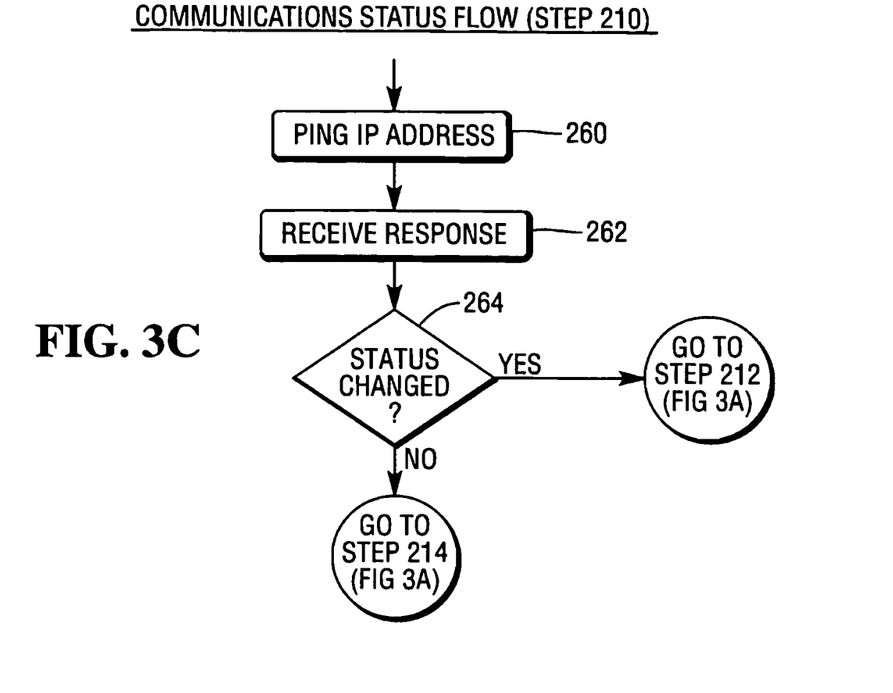

If the value of the timer 58 has decremented to zero, then the monitor application 50 ascertains if the communications status of the ATM 110 has changed from operational to non-operational (step 210). Details of the sub-steps implemented in step 210 are shown in FIG. 3C and are described below.

If the communications status of the ATM 110 has changed then the monitor application 50 (specifically, the remote management system interface 56) sends a message to the remote management system 140 to indicate the new communication status of the ATM 110 (step 212).

Figure 3D:
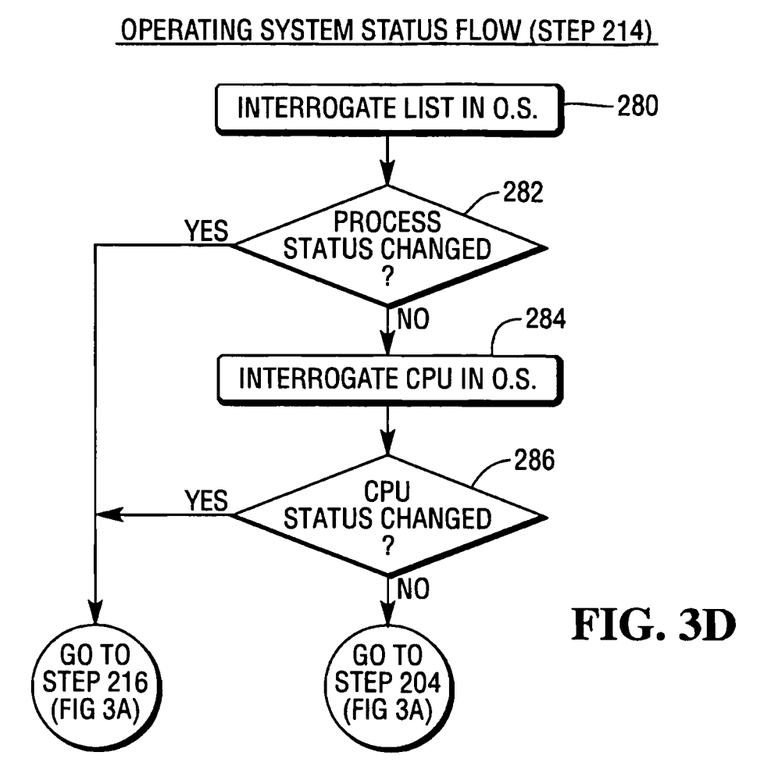

If the communications status of the ATM 110 has not changed then the monitor application 50 ascertains if the operating system status has changed (step 214). Details of the sub-steps implemented in step 214 are shown in FIG. 3D and are described below.

If the operating system indicates that the control application 20 status has changed, then the monitor application 50 (specifically, the remote management system interface 56) sends a message to the remote management system 140 to indicate the new status of the control application (step 216), then the monitor application 50 returns to step 204 to reset the timer to the initial value.

If the operating system indicates that the control application 20 status has not changed, then the monitor application 50 returns to step 204 so that the timer 58 can be reset to the initial value.

Processing a Received Event (Step 206)

The sub-steps involved in processing a received event (step 206) will now be described with reference to FIG. 3B, which shows step 206 in more detail.

When the SIU service provider 38d detects that someone (typically a service engineer) has depressed the physical mode switch 120, then the service provider 38d sends an event notification to all applications registered with it. Since the monitor application 50 registered with the service provider 38d during step 202 (FIG. 3A), the monitor application 50 will receive these notifications. The event notification conforms to the CEN XFS 3.10 standard and indicates that the physical mode switch 120 state has changed. This takes the form of a WFS_SRVE_SIU_PORT_STATUS event that reports WFS_SIU_OPERATORSWITCH.

Similarly, if the control application 20 has to stop offering customer transactions for a period of time, then the control application 20 changes the state of a logical out-of-service indicator from being in-service to being out-of-service. The event notification conforms to the CEN XFS 3.10 standard and takes the form of a WFS_SRVE_SIU_PORT_STATUS event that reports WFS_SIU_OPENCLOSE.

However, in addition to the two events received from the SIU service provider 38d that are described above, an event can be received from the SIU service provider 38d that relates to an indicator that the monitor application 50 is not interested in (because it does not reflect or relate to a change in state of the control application 20).

If the received event relates to the state of the physical mode switch 120 then this indicates that the control application 20 has changed between transaction mode (in which a customer can execute a transaction) and supervisor mode (in which a service engineer can operate on the ATM 110).

Similarly, if the received event relates to the state of the logical out-of-service indicator then this indicates that the control application 20 has changed between in-service mode (in which a customer can execute a transaction) and out-of-service mode (in which customer transactions are typically not available on the ATM 110).

In addition, an event may be received from the VDM service provider 38c that requires acknowledgement (for example, a request from the service provider 38c to enter or exit vendor dependent mode must be acknowledged by the monitor application 50), or that indicates status (for example, vendor dependent mode having been entered or exited).

Every time a status of a switch or indicator on the ATM 110 changes, then the SIU service provider 38d will send an event notification listing the status of all of the indicators and switches, which will be received by the monitor application 50 (step 230), and many of these will not be relevant to the physical mode switch 120 or the logical out-of-service indicator. For this reason, when the monitor application 50 receives an event, it ascertains if the event relates to a switch or indicator that is not relevant (step 232).

If the event is not relevant, then the monitor application 50 ignores the event (step 234).

If the event is relevant (that is, it relates to the physical mode switch 120, the logical out-of-service indicator, or vendor dependent mode), then the monitor application 50 ascertains if the physical mode switch 120 status has changed (step 236).

If the event notification indicates that the physical mode switch 120 status has changed, then the remote management system interface 56 sends a new mode status message to the remote management system 140 indicating the new mode status of the ATM 110 (step 238).

If the event notification does not indicate that the physical mode switch 120 status has changed, then the monitor application 50 ascertains if the logical out-of-service indicator status has changed (step 240).

If the event notification indicates that the logical out-of-service indicator status has changed, then the remote management system interface 56 sends a new service status message to the remote management system 140 indicating the new service status (in-service or out-of-service) of the ATM 110 (step 242).

If the event notification does not indicate that the logical out-of-service indicator status has changed, then the monitor application 50 ascertains if the VDM status has changed (step 244).

A VDM status change may be indicated by an event that reports WFS_SYSE_VDM_MODEENTERED (indicating that the ATM 110 is now in VDM mode), or WFS_SYSE_VDM_MODEEXITED (indicating that the ATM 110 is now out of VDM mode).

If the VDM status has changed then the remote management system interface 56 sends a message to the remote management system indicating the new status of the control application (step 246) since the control application 20 is in a different status when the ATM 110 is in vendor dependent mode (VDM).

If the status has not changed, then the relevant event is a request either to enter or exit vendor dependent mode. In response to this request, the monitor application 50 (via the XFS API 52) responds to the request with an acknowledgment (step 248) in accordance with the CEN XFS standard. For example, the monitor application 50 responds to a request to enter VDM with a WFS_CMD_VDM_ENTER_MODE_ACK response.

Testing the Communications Status (Step 210)

The sub-steps involved in testing the communications status of the ATM 110 (step 210) will now be described with reference to FIG. 3C.

The monitor application 50 'pings' the IP address of the remote authorization host 130 (step 260) and then receives a response (step 262).

If the 'ping' is successful, then the communications at the remote authorization host 130 are operational. If the 'ping' is not successful, then the communications at the remote authorization host 130 are not operational.

The communications status is then compared with the previous communications status (as of the last time that an IP address 'ping' was performed on the remote authorization host 130) (step 264).

If the communications status has changed (for example, from operational to non-operational, or vice versa) then the monitor application 50 proceeds to step 212 to indicate the new communications status of the remote authorization host 130.

If the communications status has not changed, then the monitor application 50 proceeds to step 214.

Testing the Operating System (Control Application) Status (Step 214)

The sub-steps involved in testing the status of the control application as indicated by the operating system (step 214) will now be described with reference to FIG. 3D.

The monitor application 50 (via the operating system interface 54) interrogates the operating system kernel 34 to ascertain if the control application 20 appears in the list of active processes (step 280).

The active process status of the control application 20 is then compared with the previous active process status (as of the last time that the operating system kernel 34 was interrogated) (step 282).

If the active process status of the control application 20 has changed, then the monitor application 50 proceeds to step 216, where the new control application status is transmitted to the remote management system 140.

If the active process status of the control application 20 has not changed, then the monitor application 50 (via the operating system interface 54) interrogates the operating system kernel 34 to ascertain the CPU utilization for the control application process (step 284).

The CPU utilization may be in one of two states: a non-working state (indicated by a zero percent utilization of the CPU 112 by the control application 20), or a working state (indicated by a non-zero percent utilization of the CPU 112 by the control application 20).

The CPU utilization state for the control application 20 is then compared with the previous CPU utilization state (as of the last time that the operating system kernel 34 was interrogated) (step 286).

If the CPU utilization state for the control application 20 has changed, then the monitor application 50 proceeds to step 216, where the new control application status is transmitted to the remote management system 140.

If the CPU utilization state for the control application 20 has not changed, then the monitor application 50 proceeds to step 204, where the internal timer 58 is reset.

It will now be appreciated that this embodiment has the advantage that a monitor application 50 can be used in conjunction with a third party control application 20 to provide a remote management system 140 with status information about the control application 20 without having to interface to the control application 20. The monitor application 50 can be used with conventional ATM software without having to modify the conventional ATM software.

Various modifications may be made to the above described embodiment within the scope of the invention, for example, the timer 58 described above decrements from an initial value to zero, in other embodiments, the timer 58 may increment from zero to a predetermined value, or any other convenient timing mechanism may be used, for example when a predetermined number of events has occurred.

In other embodiments, the remote management system and the authorization host 130 may be implemented on the same server.

In other embodiments, the communications status test (step 210) may include pinging the local network address to ascertain if there is a problem with the communications software stack on the ATM 110. In the event of such a problem being detected, however, the monitor application 50 would not be able to send a message to the remote management system 140 until the problem was repaired, unless the monitor application 50 has a separate communications facility (such as a wireless transceiver).

In other embodiments, the communications status test (step 210) may include monitoring communication packet traffic.

In other embodiments, the monitor application 50 may monitor either: events relating to the status of the physical mode switch 120, or the status of the VDM service provider 38c, rather than monitoring both.

In the above embodiment, the ATM is designed and supplied by NCR Corporation, and the proprietary run-time components 32 are also scripted and provided by NCR Corporation. In other embodiments, the ATM may be from a different ATM vendor. In such embodiments, the proprietary run-time components would also typically be provided by that vendor. Nevertheless, provided the proprietary run-time components supported XFS then the monitor application 50 could still be used to deduce the state of the control application 20.

In other embodiments, the management application 40 may implement a different protocol to SNMP, such as a different network management protocol.

In other embodiments, instead of providing a physical mode switch 120, the SST may detect a request to change modes by, for example, sensing a door being opened, a predefined key on the supervisor keyboard being pressed, or an icon on a supervisor display being selected.

In other embodiments, the SST may be able to execute customer transactions even when a customer engineer is operating on the SST.

In some embodiments, the user interface modules may also include a physical out-of-service light responsive to the state of the logical out-of-service indicator. This out-of-service light may comprise an LED array that emits green light when the ATM is in-service, and red light when the ATM is out-of-service. This means that a WFS_SRVE_SIU_PORT_STATUS event will change the status of (that is the color displayed by) the out-of-service light.

Although the monitor application flow has been described as a series of steps, these steps may be carried out in any suitable order, or simultaneously where appropriate. The steps described in the above embodiment are intended to illustrate how the monitor application 50 responds to notifications from service providers 38 or from information retrieved from the operating system 34, it is not intended to imply that any particular programming structure is used. For example, the events are received asynchronously and interrupt any processing that is taking place, for example, a received event may be processed during a call to the operating system to ascertain if the control application is executing on the operating system's task list.

The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. A method of monitoring a control application executing on a self-service terminal, the method comprising:
   registering with a services manager to receive event reports from platform service providers indicative of a change of state relating to the control application, the control application presenting a sequence of screens to a customer during a transaction;
   accessing an operating system function to deduce a current status of the control application;
   communicating the current status of the control application to a remote management system, the current status is deduced through interactions with the operating system and communicated without communicating with the control application, without any interface to the control application, and without any modifications made to the control application, the current status communicated to the remote management system enabling the remote management system to manage the self-service terminal; and
   wherein the event reports indicative of a change of state relating to the control application comprise event reports relating to a notification of entry into vendor dependent mode (VDM).

2. The method of claim 1, wherein the event reports indicative of a change of state relating to the control application comprise event reports relating to a change in state of a physical switch.

3. The method of claim 1, wherein the event reports indicative of a change of state relating to the control application comprise event reports relating to a change in state of an open/closed indicator.

4. The method of claim 1, wherein accessing an operating system function to deduce the current status of the control application comprises ascertaining if the control application is listed on an operating system active process list.

5. The method of claim 1, wherein accessing an operating system function to deduce the current status of the control application comprises ascertaining if the control application is listed as being in an executing state.

6. The method of claim 1, wherein accessing an operating system function to deduce the current status of the control application comprises ascertaining if a central processing unit on which the control application is intended to execute has a current utilization for the control application that is non-zero or variable.

7. The method of claim 1, wherein the method further comprises testing a communications connection to a remote authorization host to deduce the current status of the control application.

8. The method of claim 1, wherein testing a communications connection is implemented by executing a 'ping' on an internet protocol (IP) address of the remote authorization host.

9. The method of claim 1, wherein testing a communications connection is implemented by monitoring communication packet traffic.

10. A monitoring component for monitoring a control application executing on a self-service terminal comprising:
    the self-service terminal configured with non-transitory media having a defined software interface that executes on the self-service terminal and the defined software interface for receiving event reports from platform service providers via a services manager, the event reports being indicative of a change of state relating to the control application, the control application presenting a sequence of screens to a customer during a transaction;
    the self-service terminal also configured with an operating system interface that executes on the self-service terminal and the operating system for accessing an operating system function to deduce a current status of the control application;
    the self-service terminal configured with a communications interface that executes on the self-service terminal and the communications interface for communicating a status of the control application to a remote management system based on information received from at least one of the defined software interface and the operating system interface, thereby enabling the remote management system to manage the self-service terminal, the current status deduced through interactions with the operating system and without communicating with the control application, without any interface to the control application, and without any modifications made to the control application; and wherein the event reports indicative of a change of state relating to the control application comprise event reports relating to a notification of entry into vendor dependent mode (VDM).

11. The monitoring component of claim 10, wherein the monitoring component is embedded in the self-service terminal.

12. The monitoring component of claim 11, wherein the self-service terminal includes a cash dispenser.

13. A method implemented in a non-transitory computer readable medium having computer executable instructions that when executed on a self-service terminal provides the method comprising:

registering, by the self-service terminal, with a services manager to receive event reports from platform service providers indicative of a change of state relating to a control application, the control application presenting a sequence of screens to a customer during a transaction;

accessing, by the self-service terminal, an operating system function to deduce a current status of the control application;

communicating, by the self-service terminal and via interactions with the operating system, the current status of the control application to a remote management system, without any interface to the control application, without any modifications made to the control application, and without communicating with the control application, the current status communicated to the remote management system enabling the remote management system to manage the self-service terminal; and wherein the event reports indicative of a change of state relating to the control application comprise event reports relating to a notification of entry into vendor dependent mode (VDM).

* * * * *